United States Patent
Krstic et al.

(10) Patent No.: US 6,367,167 B1
(45) Date of Patent: Apr. 9, 2002

(54) DURABLE OUTSOLE FOR ARTICLE OF FOOTWEAR

(75) Inventors: Ruzica Krstic, Portland, OR (US); Leonard Edward Raymond Kosinski, Chadds Ford, PA (US)

(73) Assignees: Nike, Inc., Beaverton, OR (US); E.I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/533,579

(22) Filed: Mar. 23, 2000

Related U.S. Application Data

(63) Continuation-in-part of application No. 09/292,764, filed on Apr. 14, 1999.

(51) Int. Cl.[7] ................. A43B 13/00; A43B 23/28; A43C 15/00; B32B 27/00; B32B 3/06
(52) U.S. Cl. .................. 36/25 R; 36/59 C; 36/67 A; 36/67 D; 428/99; 428/421
(58) Field of Search ................... 428/421, 422, 428/99, 120; 36/25 R, 59 C, 62, 67 R, 67 A, 67 D

(56) References Cited

U.S. PATENT DOCUMENTS

| | | | | |
|---|---|---|---|---|
| 4,223,459 A | * | 9/1980 | Riggs | 36/59 C |
| 4,287,307 A | * | 9/1981 | Hostettler | 36/25 R |
| 4,402,145 A | * | 9/1983 | Dassler | 36/59 C |
| 4,481,333 A | | 11/1984 | Fleischer et al. | |
| 4,547,979 A | * | 10/1985 | Harada et al. | 36/59 C |
| 4,559,366 A | * | 12/1985 | Hostettler | 36/25 R |
| 4,741,114 A | * | 5/1988 | Stubblefield | 36/59 C |
| 5,143,963 A | | 9/1992 | Sterling et al. | |
| 5,286,773 A | | 2/1994 | Sterling et al. | |
| 5,335,429 A | * | 8/1994 | Hansen | 36/62 |
| 5,632,057 A | | 5/1997 | Lyden | |
| 5,643,516 A | | 7/1997 | Raza et al. | |
| 5,663,127 A | | 9/1997 | Flynn et al. | |
| 5,700,843 A | | 12/1997 | Valoppi | |
| 5,704,137 A | | 1/1998 | Dean et al. | |
| 5,832,636 A | | 11/1998 | Lyden et al. | |
| 5,864,968 A | | 2/1999 | Mann | |
| 6,016,613 A | * | 1/2000 | Campbell | 36/59 C |
| 6,018,889 A | * | 2/2000 | Friton | 36/28 |
| 6,076,283 A | * | 6/2000 | Boie | 36/59 C |

FOREIGN PATENT DOCUMENTS

JP 60-104161 6/1985

OTHER PUBLICATIONS

Abstract only of JP960271618.
Abstract only of EP113114.

* cited by examiner

*Primary Examiner*—Anthony Stashick
(74) *Attorney, Agent, or Firm*—Banner & Witcoff, Ltd.

(57) ABSTRACT

An article of footwear, such as an athletic shoe, having a wear resistant outsole is disclosed. The article of footwear includes an upper secured to a sole having a ground engaging portion with a wear resistant material composed of a thermoplastic polymer blended with an effective amount of a fluorocarbon additive to improve wear resistance. In a preferred embodiment, the sole has ground engaging protrusions or cleats with at least the tip of one cleat composed of the wear resistant material. Preferably, the wear resistant material is a blend of thermoplastic polyurethane, such as Bayer Corporation's TEXIN 285™ or DESMOPAN 8785™, blended with 0.1% to 3% perfluoropolyether, such as DuPont FLUOROGUARD® Polymer Additive.

13 Claims, 1 Drawing Sheet

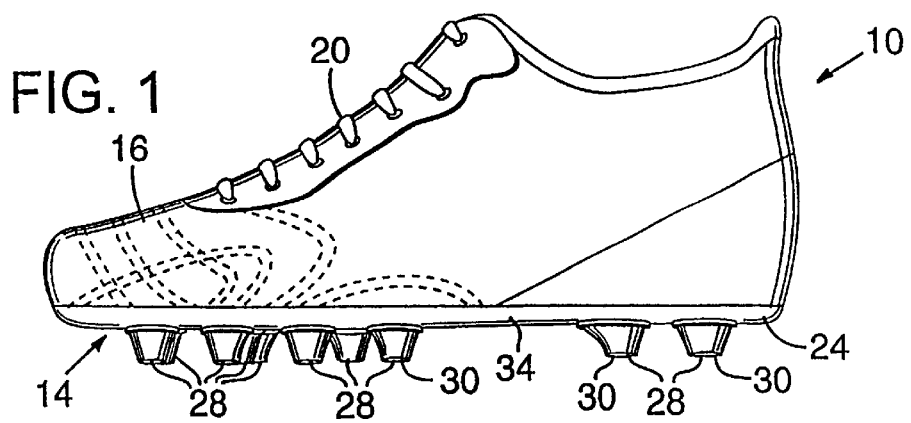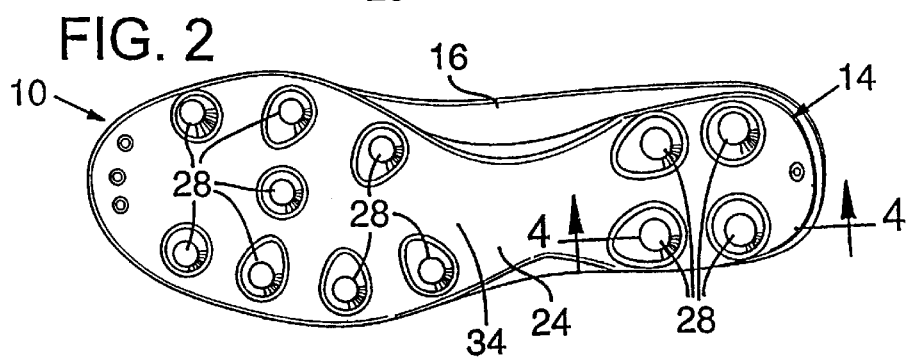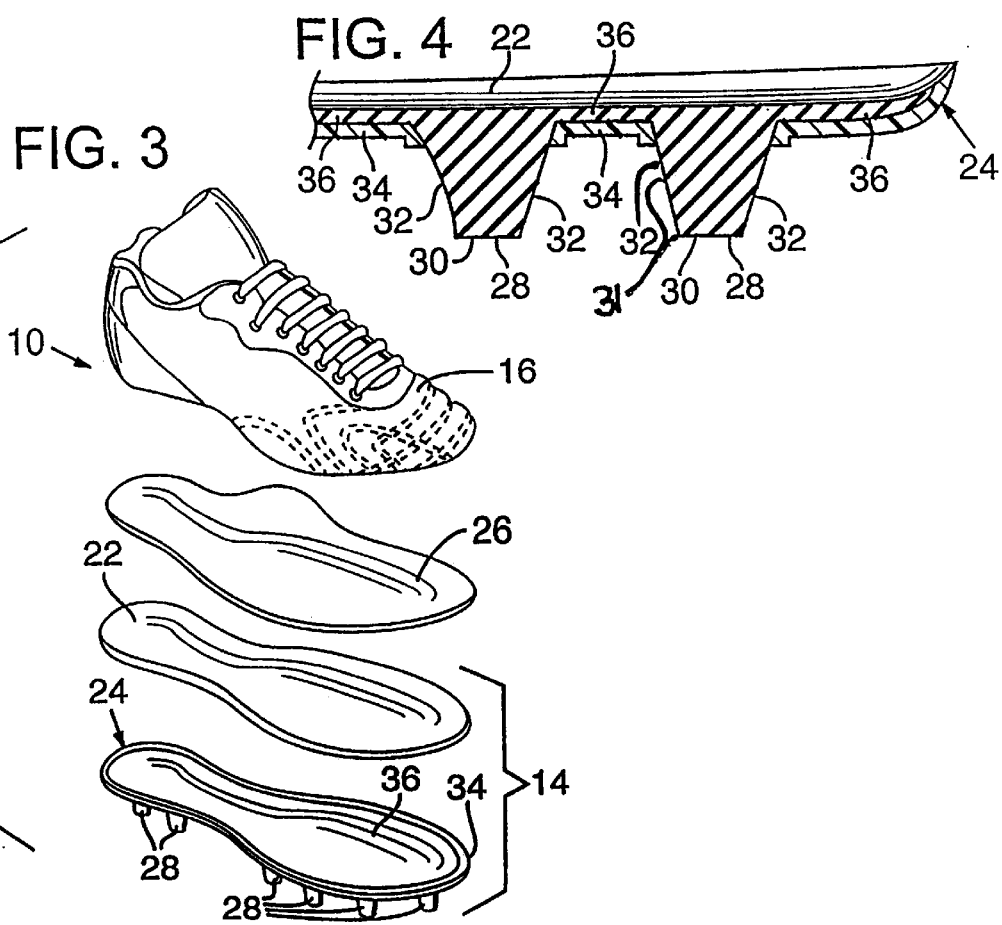

DURABLE OUTSOLE FOR ARTICLE OF FOOTWEAR

The is a continuation-in-part of U.S. patent application Ser. No. 09/292,764, filed on Apr. 14, 1999, and which is currently pending.

FIELD OF THE INVENTION

The present invention relates to a durable outsole for an article of footwear. More particularly, the invention relates to a thermoplastic polyurethane outsole for an article of footwear having dispersed fluorocarbon additives, preferably perfluoropolyether ("PFPE") additive, in the ground engaging portions of the outsole, such as a cleat of a cleated athletic shoe, thereby improving wear resistance and traction of the outsole.

BACKGROUND OF THE INVENTION

Modern articles of footwear, such as athletic shoes, are a highly refined combination of many elements which have specific functions, all of which work together for the support and protection of the foot. Athletic shoes today are as varied in design and purpose as are the rules for the sports in which the shoes are worn. Tennis shoes, racquetball shoes, basketball shoes, running shoes, soccer shoes, baseball shoes, football shoes, walking shoes, etc. are all designed to be used in very specific, and very different, ways. They are also designed to provide a unique and specific combination of traction, support and protection to enhance performance.

In general, an athletic shoe is divided into two general parts, an upper and a sole. The upper is designed to snugly and comfortably enclose the foot. Typically, it will have several layers including a weather and wear-resistant outer layer of leather or synthetic material, such as nylon, and a soft, padded inner layer for foot comfort.

The sole provides a broad, stable base to support the foot during ground contact. The sole must also provide traction, protection, and a durable wear surface. It must have an extremely durable bottom surface to contact the ground, together with a shock absorbing midsole to absorb the considerable force to which the foot and leg are subjected during the repeated ground contact which occurs during running. In addition, protruding traction members, or cleats, are desirable on the ground engaging portions of the bottom surface for certain sports such as baseball and soccer.

Cleats of soles are traditionally molded with natural materials, such as rubber, or synthetic materials, such as high abrasion thermoplastic polyurethanes ("TPUs"). TPUs commonly used in such applications have a Shore A hardness of about 80 to 100, as measured by ASTM Method D-2240-91. Representative useful TPUs are sold by the Bayer Corporation under the trademarks TEXIN™ and DESMOPAN™. However, such cleats tend to become clogged with debris during use, and wear down with repeated use.

As explained more fully in U.S. Pat. No. 5,832,636 to Lyden et al, the disclosure of which is hereby incorporated by reference, one method for preventing cleats from becoming clogged during use is to include an adhesion prevention material having both a low coefficient of friction and a low wettability with respect to water in a portion of the ground engaging surface. Preferred adhesion prevention materials include using "neat polymers," such as solid polytetrafluoroethylene ("PTFE"), compounded with "pigments, fillers, reinforcements, lubricants, processing aids, and curatives" to make useful compositions having a coefficient of friction preferably less than 0.4. In order to prevent a reduction in traction, the tips of the cleats in Lyden et al. remain substantially free of such adhesion prevention material.

U.S. Pat. Nos. 5,143,963 and 5,286,773 to Sterling, et al., the disclosures of which are hereby incorporated by reference, disclose a composition of matter formed by melt-blending a thermoplastic polymer with a concentration of fluorocarbon additive ranging between 0.01% to 1%. Disclosed fluorocarbon additives include perfluoropolyether ("PFPE"), such as FLUOROGUARD® Polymer Additive manufactured and sold by the E.I. DuPont DeNemours Corporation. Sterling et al. discloses the tensile strength, surface energy, and water contact angles of the various compositions disclosed, and suggests that because of the high hydrophobicity and low surface energy, "sticking" of the composition to a mold during the molding process is reduced, thereby enhancing mold release. These references are silent regarding the durability of the compositions disclosed, and they neither teach nor suggest using such compositions in the ground engaging portions of an article of footwear for improved durability.

U.S. Pat. No. 5,864,968 to Mann, the disclosure of which is hereby incorporated by reference, discloses a shoe insole having a container containing liquid PFPE for absorbing the impact of a foot wearing the shoe. There is no teaching or suggestion in Mann to use or combine PFPE, or other disbursed fluorocarbon additives, with polymers to provide wear resistant ground engaging portions of the sole of a shoe.

Thus, despite the disclosures of the above-discussed patents, there remains a need for an article of footwear having a sole with durable ground engaging portions, particularly at the tips of any protruding traction members or cleats, without adversely affecting the traction of these ground engaging portions.

SUMMARY OF THE INVENTION

An article of footwear, such as an athletic shoe, according to the present invention includes an upper secured to a sole having a ground engaging portion with a wear resistant material composed of a thermoplastic polymer blended with 0.1% or more of a fluorocarbon additive. The upper limit of additive is the amount of additive that can be associated with the molten TPU during melt processing, typically 2.5 to 3% of the total composition, depending on the particular ingredients selected. In a preferred embodiment, the sole has ground engaging protrusions or cleats with each cleat composed of the wear resistant material, and the wear resistant material is a blend of TPU of Shore A hardness of from 80–100 as measured by ASTM Method D-2240-91, such as Bayer Corporation's TEXIN 285™ or DESMOPAN 8785™, blended with more than 0.1% PFPE, such as DuPont's FLOUROGUARD© Polymer Additives having molecular weights ranging from 1500 up to 15,000, preferably 4,700 grams/mole.

Various advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there are illustrated and described preferred embodiments of the invention.

BRIEF DESCRIPTION OF THE DRAWINGS

FIG. 1 is a side plan view of a shoe having a sole in accordance with a preferred embodiment of the present invention.

FIG. 2 is a bottom plan view of the shoe of FIG. 1.

FIG. 3 is an exploded isometric view of the shoe of FIG. 1.

FIG. 4 is an enlarged cross-sectional view taken along line 4—4 of FIG. 2.

DETAILED DESCRIPTION OF THE PREFERRED EMBODIMENTS

An article of footwear having an improved durability sole is disclosed. Referring to FIGS. 1–4, wherein like numerals indicate like elements, an article of footwear in accordance with a preferred embodiment of the present invention, such as an athletic shoe, is generally shown as 10. Shoe 10 includes a sole structure 14 and an upper 16 attached to it. Upper 16 can be of any conventional design, and preferably is flexible and includes attaching devices 20, such as loops and a shoe lace or a zipper for detachably, but snugly, securing the upper to the foot. Sole structure 14 incorporates novel features of the present invention.

As best shown in FIG. 3, sole structure 14 preferably includes an optional cushioning midsole 22 secured to a ground-engaging outsole 24. The midsole 22 is formed of a cushioning, resilient foam material, such as a polyurethane foam into which a sealed resilient insert (not shown) may be encapsulated. The insert is preferably a gas-filled bladder or chamber formed according to the teachings of U.S. Pat. Nos. 4,183,156, 4,219,945, 4,906,502, 5,543,194 to Marion F. Rudy, the disclosures of which are hereby incorporated by reference. Such a gas-filled bladder is formed from a flexible material which is sealed along its perimeter and at preselected locations within its perimeter which, after being filled to a relatively high pressure by a gas having a low diffusion rate through the flexible material, takes on a generally flat bladder configuration. The bladder is thereafter encapsulated in the foam material comprising the remainder of the midsole. Alternatively, the insert can be omitted and the entire midsole 22 can be formed of a cushioning foam material or columns of cushioning material such as disclosed in U.S. Pat. Nos. 5,343,639 and 5,353,523 to Kilgore et al., the disclosures of which are hereby incorporated by reference. In any case, the midsole 22 functions as a compressible and resilient unit which cushions foot impact. The shoe upper 16 is attached either to the midsole 22 or outsole 24 to form the article of footwear 10. A sock liner 26 is preferably placed within the shoe upper 16.

Referring to FIGS. 1–4, outsole 24 further includes a plurality of protruding ground-engaging traction members 28 or cleats, each having a tip or distal portion 30 and sides 32 that are adjacent or proximate the generally planar ground engaging surface plate 34 of the sole structure 14. Traction members 28 can include cleats, spikes, lugs or any other type of element used for improving the traction of the sole with the ground. Although the ground engaging surface plate 34 is generally planar, it nevertheless can include some degree of curvature so as to correspond to the natural shape of the wearer's foot.

In a preferred embodiment, at least the tips 30 of traction members 28 are constructed with one or more wear resistant materials, the requirements and selection of which are discussed below. More preferably and as best shown in FIG. 4, the entire traction members 28 are constructed with one or more wear resistant materials, and they are joined together by a thin plate 36 of wear resistant material formed during the molding process. The thin plate 36 is then secured to the ground engaging surface plate 34 with the traction members protruding from the surface plate 34 as shown in FIG. 4. The surface plate 34 is less prone to premature wear, and therefore may be constructed with traditional TPU. Such construction reduces the amount of wear resistant material used on each shoe 10, thereby minimizing the cost of each shoe. Alternatively, the entire sole structure 14, including the protruding traction members 28 and the surface plate 34 may be molded with the wear-resistant material.

Of course if desired, the wear resistant material can occupy a limited portion 31 (FIG. 4) of the tip 30. The length of the limited portion 31 (FIG. 4) could range from a thin surface layer to the entire length of the traction member 28. One method for producing such a structure includes dual molding the traction member with both the wear-resistant material and another material. Alternatively, the thin surface layer (not shown) of the wear resistant material can be applied with known methods, such as spraying the molten wear-resistant material onto a traditional traction member.

U.S. Pat. Nos. 5,286,773 and 5,143,963 to Sterling et al. disclose compositions of matter formed by melt-blending a thermoplastic polymer and from about 0.01% to less than 1%, by weight, of a fluorocarbon additive selected from the group consisting of a fluorocarbon oil, a fluorocarbon gum, a fluorocarbon grease and mixtures thereof, the fluorocarbon additive having a lower surface energy than that of the polymer, and the melt-blending resulting in a substantially homogenous mixture of the polymer and the fluorocarbon additive such that upon cooling, a solid composition results. In order to avoid undue repetition, the disclosure of these patents have been incorporated by reference.

Such materials also have improved wear resistant properties in ground-engaging portions 28 of article of footwear sole structures 14. The preferred compositions of matter for such use in an article of footwear are set forth in greater detail below. However, in light of the similar chemical compositions, it is expected that all compositions of matter disclosed in U.S. Pat. Nos. 5,143,963 and 5,286,773 will have similar wear-resistant properties when used in ground engaging portions of articles of footwear.

Thermoplastic Polyurethanes (TPUs) useful for the present invention are of Shore A hardness of from about 80 to 100, as measured by ASTM Method D-2240-91. Any TPU chemistry will be useful as long as the previously stated Shore A hardness limits are satisfied. TPUs generally are formed via a polyaddition reaction of di- or polyisocyanates with diols or polyols. The isocyanates can include one or multi ring aromatic, aromatic-aliphatic, aliphatic, cyclic aliphatic chemistries or mixtures thereof. The polyol chemistries can include, but are not necessarily limited to include polyesters, polyethers, polycaprolactone, polycarbonate, mixtures thereof, and block or random copolymers thereof. Short chain diols or low molecular weight polyols can be used as TPU molecular chain extenders. Polyhydroxyl and polyamino compounds can be used together to form thermoplastic polyurethane/polyureas useful in the present invention.

Preferable thermoplastic polymers include DESMOPAN 8792™ and TEXIN 285™ made and sold by the Bayer Corporation. A preferable fluorocarbon additive is PFPE having the following chemical composition:

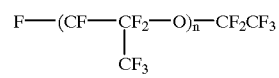

-continued

Where n=10–60

One known PFPE having such properties is made and sold by the E.I. DuPont DeNemours Corporation under the trade name FLUOROGUARD© Polymer Additives with molecular weights ranging from 1500 up to 15,000, preferably 4,700 grams/mole.

The thermoplastic polymer and PFPE melt-blended during compounding, or during the injection molding process, forms the traction members and thin plate previously described in accordance with the methods disclosed in U.S. Pat. Nos. 5,143,963 and 5,286,773. In addition, beneficial results were obtained with PFPE concentrations as high as 2%, by weight.

Preferably, the injection molding machine is set to the following temperatures and pressures: nozzle, front, and middle temperatures are set to 215° C., and rear temperature is set to 210° C. The hold pressure and back pressure are 750 psi and 100 psi, respectively, with a high limit of 800 psi. Prior to molding, the material is dried at 85° C. for four hours.

Testing of traction members manufactured according to this process and material reveal that the wear resistance of these materials is improved over control samples consisting of the same TPU, but with no PFPE additive. For example, mechanical testing of soles, traction members of soles, and materials comprising these elements including DESMOPAN 8792™ alone, and DESMOPAN 8792™ combined with 0.5%, 1.0%, 1.5% and 2.0% Of FLUOROGUARD® additive PFPE, respectively, were tested and analyzed. These tests included a McNeill Spike Test, a Bjorksten Walking Device Abrasion Test, a DIN Abrasion Test, and an Akron Abrasion Test. Similarly, limited testing was also performed with TEXIN 285™ TPU alone, and TEXIN 285™ combined with 0.25%, 0.50%, and 1.00% of FLUOROGUARD® additive PFPE. In general, the results suggest that DESMOPAN 8792™ and TEXIN 285™ with the FLUOROGUARD® additive have improved wear-resistance over their respective control samples of DESMOPAN 8792™ and TEXIN 285™ alone.

In addition, limited wear tests of the shoes having the wear resistant sole were performed by professional wear testers. While the results from this limited testing did not show as much of an improvement in wear resistance as found during the mechanical testing, the results generally support the conclusion that wear resistance of traction members manufactured according to this process and material is improved over control samples consisting of the same TPU, but with no PFPE additive.

As explained more fully in U.S. Pat. Nos. 5,143,963 and 5,286,773, fluorocarbon oils, such as PFPE, are used primarily as a lubricant. Accordingly, it would be logical to assume that mixing such a lubricant with a TPU would make that TPU concentration less "sticky" or more "slippery." Such a characteristic is undesirable in the ground engaging tips of traction members of cleated shoes. However, testing reveals that TPU with PFPE additives in accordance with the present invention have the opposite and unexpected result. Namely, testing suggests that TPU with PFPE additive has a greater coefficient of friction than the same TPU with no PFPE additive. In particular, traction testing on dry and wet concrete suggests that DESMOPAN 8792™ with 0.5% FLUOROGUARD® additive PFPE had a greater dynamic coefficient of friction than DESMOPAN 8792™ with no additive on both wet and dry concrete.

In view of the wide variety of embodiments to which the principles of the invention can be applied, it should be apparent that the detailed embodiments are illustrative only and should not be taken as limiting the scope of the invention. Rather, the claimed invention includes all such modifications as may come within the scope of the following claims and equivalents thereto.

What is claimed is:

1. An article of footwear including:
   a sole structure having an outsole;
   said outsole having a ground engaging portion comprising a composition of a thermoplastic polymer melt-blended with an effective amount of a fluorocarbon additive selected from the group consisting of a fluorocarbon oil, a fluorocarbon grease and mixtures thereof to form a solid composition upon cooling, said composition being wear resistant; and
   an upper secured to said sole structure.

2. The article of footwear of claim 1, wherein said flourocarbon additive has a concentration by weight between 0.1% to 3.0%, inclusive.

3. The article of footwear of claim 1, wherein said thermoplastic polymer has a Shore A hardness between 80 to 100, inclusive.

4. The article of footwear of claim 1, wherein said outsole includes at least one ground-engaging traction member having a tip containing said composition.

5. The article of footwear of claim 4, wherein said composition occupies a limited portion of said tip.

6. The article of footwear of claim 4, wherein said ground engaging traction member is a cleat.

7. The article of footwear of claim 1, wherein said thermoplastic polymer is a thermoplastic polyurethane and said fluorocarbon additive is a perfluoropolyether.

8. The article of footwear of claim 7, wherein said perfluoropolyether has a molecular weight in the range of 1500 to 15,000.

9. An article of footwear comprising:
   an upper for accommodating and securing said article of footwear to a wearer's foot;
   a sole attached to said upper, said sole including a generally planar ground engaging surface and at least two traction members projecting from said generally planar ground engaging surface, each of said at least two traction members including a base surface adjacent said generally planar ground engaging surface, side surfaces, and a tip; and
   wherein said tip of said at least two traction members are comprised of a thermoplastic polymer melt-blended with an effective amount of a fluorocarbon additive to form a solid, wear resistant composition upon cooling.

10. The article of footwear of claim 9, wherein said flourocarbon additive has a concentration by weight between 0.1% to 3.0%, inclusive.

11. The article of footwear of claim 9, wherein said thermoplastic polymer has a Shore A hardness between 80 to 100, inclusive.

12. The article of footwear of claim 9, wherein said thermoplastic polymer is a thermoplastic polyurethane and said fluorocarbon additive is a perfluoropolyether.

13. The article of footwear of claim 12, wherein said perfluoropolyether has a molecular weight in the range of 1500 to 15,000.

* * * * *